(12) United States Patent
Jeremic et al.

(10) Patent No.: US 8,362,102 B2
(45) Date of Patent: Jan. 29, 2013

(54) INKJET PRINTING

(75) Inventors: Natasha Jeremic, Hertfordshire (GB); Shaun Christopher Hazlewood, Suffolk (GB)

(73) Assignee: Xennia Technology Limited, Hertfordshire (GB)

( * ) Notice: Subject to any disclaimer, the term of this patent is extended or adjusted under 35 U.S.C. 154(b) by 143 days.

(21) Appl. No.: 12/447,502

(22) PCT Filed: Nov. 2, 2007

(86) PCT No.: PCT/GB2007/004197
§ 371 (c)(1),
(2), (4) Date: Jun. 3, 2009

(87) PCT Pub. No.: WO2008/053235
PCT Pub. Date: May 8, 2008

(65) Prior Publication Data
US 2010/0068476 A1 Mar. 18, 2010

(30) Foreign Application Priority Data
Nov. 4, 2006 (GB) .................................. 0622034.7

(51) Int. Cl.
*C09D 11/10* (2006.01)
*B32B 3/10* (2006.01)
*B05D 5/00* (2006.01)

(52) U.S. Cl. .......... 522/85; 524/548; 524/555; 524/556; 524/558; 524/560; 428/195.1; 427/256

(58) Field of Classification Search ............... 524/548, 524/555, 556, 558, 560
See application file for complete search history.

(56) References Cited

U.S. PATENT DOCUMENTS

| | | | |
|---|---|---|---|
| 5,623,001 A * | 4/1997 | Figov | 522/84 |
| 6,232,361 B1 | 5/2001 | Laksin et al. | |
| 6,428,862 B1 | 8/2002 | Noguchi | |
| 6,608,119 B2 * | 8/2003 | Tanabe et al. | 522/74 |
| 6,627,677 B2 * | 9/2003 | Smith | 523/160 |
| 6,858,656 B2 * | 2/2005 | Biro et al. | 522/84 |
| 2005/0080152 A1 * | 4/2005 | Bergiers et al. | 522/71 |
| 2005/0197418 A1 * | 9/2005 | Graziano et al. | 522/74 |

FOREIGN PATENT DOCUMENTS

| | | |
|---|---|---|
| EP | 1 705 228 A1 | 9/2006 |
| EP | 1 777 272 A1 | 4/2007 |
| JP | 2000-186243 A | 7/2000 |
| JP | 2002-531678 A | 9/2002 |
| JP | 2004-189930 A | 7/2004 |
| JP | 2004-211095 A | 7/2004 |
| JP | 2006-274029 A | 10/2006 |
| WO | 2000/034400 A1 | 6/2000 |
| WO | WO 03/010250 A1 | 2/2003 |
| WO | 2005/012448 A2 | 2/2005 |
| WO | WO 2005/052071 A1 | 6/2005 |
| WO | WO 2006/080139 A1 | 8/2006 |
| WO | WO 2007/036692 A1 | 4/2007 |

* cited by examiner

Primary Examiner — Vu A Nguyen
(74) Attorney, Agent, or Firm — Morgan, Lewis & Bockius LLP

(57) ABSTRACT

A single phase aqueous curable composition suitable for thermal inkjet printing comprises a mixture of curable materials, water in amounts in the range 10 to 30% of the weight of the compositions, and one or more co-solvents for the curable materials. Because the water content is relatively low, a drying step is not required before curing, increasing printing speeds. The composition has good performance and has good adhesion to a wide range of substrates including non-porous and semi-porous materials as well as porous materials.

24 Claims, No Drawings

INKJET PRINTING

This application is a 371 filing of PCT/GB2007/004197 (WO 2008/053235), filed Nov. 2, 2007, claiming priority benefit of GB 0622034.7, filed Nov. 4, 2006.

FIELD OF THE INVENTION

This invention relates to inkjet printing, particularly thermal inkjet printing, and concerns compositions suitable for thermal inkjet printing.

BACKGROUND OF THE INVENTION

Inkjet printing processes fall into two main types: continuous processes and drop-on-demand (DOD) processes. Continuous processes use electrically conductive inks to produce a stream of drops electrically charged ink that are deflected by an electric field to an appropriate location on a substrate. In DOD processes, individual drops of ink are expelled from the nozzle of a print head either by vibration of a piezoelectric actuator (in piezoelectric inkjet printing) or by heating the ink to form a vapourised gas bubble (in thermal inkjet printing, also known as bubblejet printing). Thermal inkjet printing has advantages over piezoelectric printing, with printers and print heads being lower cost and with the printing process being able to achieve better resolution.

Inkjet inks need to satisfy a number of requirements, including the following:

1. Viscosity must be appropriate. With DOD inks there are greater limitations on inks for thermal printing than for piezoelectric printing, with it generally being necessary for inks to have a viscosity of below 4 mPa·s at printhead operating temperature (typically 35 to 85° C.), which usually equates to a viscosity of less than 12 mPa·s at room temperature (25° C.), to be capable of being thermally inkjet printed. In this specification, all viscosity values are at 25° C. unless otherwise specified.

2. The ink must not cause unacceptable levels of clogging or blockage of printing nozzles.

3. The ink must not result in build up of deposits on the ejection heaters of thermal inkjet print heads (a process known as kogation) to an unacceptable level during the working life of a printhead.

4. The ink should be stable in storage, without settling out or coagulation of materials.

5. The resulting print needs to satisfy desired characteristics depending on the field of use, with possible relevant factors including water fastness, scratch resistance, durability, lack of shrinkage, lack of cracking, flexibility, optical density (for coloured inks), uniformity of deposition.

Conventional thermal inkjet printheads typically require use of an ink with a high percentage (over 50% by weight) of water or volatile organic solvent in order to achieve effective inkjet printing. While generally a poor solvent for organic compounds and having too high a surface tension to wet many plastic substrates, water may nevertheless be the ideal solvent for coating and ink delivery, being able to lower viscosity and volatilize without adding to emissions, toxicity or odour. Aqueous inks, however, require proportionally longer drying times than typical solvent-based inks, thus impacting on the maximum rate of printing.

Increasing the print speed often means that the inkjet ink should desirably dry more quickly such that the final print does not smudge when stacked. Inks demonstrating reduced drying times can be achieved by, for example, using volatile solvents in place of at least some of the water in the liquid medium. However solvent-based inks are potentially hazardous due to flammability issues and environmental concerns.

Inks with a quicker drying time due to lower water content, however, often result in an increased tendency for the ink to dry in the nozzles whilst the printer is not actively printing. Ink dried in nozzles tends to cause difficulty in printing properly again after periods of rest. Nozzles may become blocked, may fire intermittently or may fire improperly, a kind of operability problem more specifically referred to as decap.

Solvents such as alcohol or methyl ether ketone (MEK) are known to improve (shorten) drying time, since such substances have higher vapour pressure than water, and so evaporate faster. Also, these solvents have a surface tension less than 25 dynes/cm, compared to 72 dynes/cm for water, giving the solvents superior wetting characteristics on non-porous substrates, and helping adhesion to the surface.

Various inks for inkjet printing processes are known in the art. Generally, the inkjet inks used in the art are aqueous inks, comprising a major quantity of water, a humectant and/or a co-solvent, together with a colouring agent. By selecting specific surfactants, humectants, colouring agents, or other components, it is possible to adjust the print characteristics of the resultant ink.

Although numerous inkjet inks are presently available, they generally do not meet all of the above-described requirements, while also providing excellent print quality on the wide variety of plain papers generally used in the home and office. Particularly, adhesion of these inkjet inks to semi-porous and non-porous substrates is desirable.

Great effort has been expended in attempts to provide both dye-based and pigment-based inkjet inks having acceptable adhesion on non-porous substrates while maintaining other desirable characteristics. However, there continues to be a demand for inks having all of the above-mentioned desirable characteristics.

More recently, commercial interest in thermal inkjet inks has tended to focus more on developing curable ink formulations, more specifically radiation- or thermally-curable ink formulations, in which a UV (ultra violet) or infra red lamp, or a combination thereof, is employed to bring about a fast cure rate. The use of such devices necessarily reduces the time-consuming process for removing solvent from the ink thereby increasing the production speed, particularly in industrial printing processes such as in mailing and addressing.

U.S. Pat. No. 5,623,001 discloses UV-curable aqueous DOD inkjet inks, particularly for piezoelectric printing, comprising water and water-miscible UV-curable monomer and/or oligomer e.g. acrylic materials. The document makes no reference to thermal inkjet printing, and does not teach how to make inks, particularly low water content inks, suitable for thermal inkjet printing.

U.S. 2002/0198289 concerns UV-curable aqueous thermal inkjet inks comprising UV-curable resin, suitable for printing waterfast images on porous media. The examples all use a water content of over 35%, and there is no teaching of how to make a low water content thermal inkjet ink.

U.S. Pat. No. 4,978,969 concerns UV-curable thermal inkjet inks with good adhesion to plastics. The inks comprise UV-curable adhesive, and the exemplified inks use a mixture of three solvents, water, methyl ethyl ketone and gamma-butyrolactone, each at 5% by weight to ensure a homogenous inkjet ink composition with viscosity and surface tension properties suitable for use in inkjet printing. The benefits of organic solvent-based inkjet inks are overshadowed by the environmental and hazardous downsides of these components particularly the issues of flammability and transportation. Moreover, inkjet ink compositions comprising volatile liquids are often subject to an increased tendency for the ink to dry in the nozzles. The document does not teach how to make a single phase ink with a water content above 5% by weight.

WO 03/011989 describes a UV-curable ink for inkjet printing that is free of aqueous and volatile organic solvents.

WO 2004/092287 discloses essentially non-aqueous radiation-curable inkjet ink compositions.

WO 2006/102524 discloses substantially non-aqueous (i.e. having a water content of less than 10%) UV-curable thermal inkjet inks using a volatile driver fluid such as acetone, methyl or ethyl acetate, methanol, ethanol or propanol.

U.S. Pat. No. 6,790,875 discloses low viscosity curable thermal inkjet inks, with the exemplified inks generally having a water content in excess of 50% by weight.

U.S. Pat. No. 5,952,401 concerns low viscosity aqueous inkjet inks generally containing at least 50% by weight water.

Curable materials, e.g. monomers and oligomers, tend to have limited solubility/miscibility in water, and substantial practical difficulties arise in producing water-based inks with sufficiently low viscosity to be useful for thermal inkjet printing that do not undergo undesirable phase separation, do not cause clogging or blockage of printing nozzles, do not result in unacceptable levels of kogation, and that produce prints with appropriate, useful properties.

We have found that by use of mixtures of curable materials together with a water-compatible solvent (referred to as co-solvent) for the curable materials it is possible to produce low viscosity compositions suitable for thermal inkjet printing having a reduced water content compared to known aqueous thermal inkjet inks without needing to use undesirable volatile organic solvents while still being capable of achieving effective bubble nucleation.

The challenge therefore is to provide a single phase, low aqueous solvent containing radiation-curable thermal inkjet ink formulation that retains characteristics of good ejection stability, while removing the need for infra red and/or increased UV exposure to accelerate the drying process on non-porous media.

SUMMARY OF THE INVENTION

In one aspect, the present invention provides a single phase aqueous curable composition suitable for thermal inkjet printing, comprising a mixture of curable materials; water in an amount in the range 10 to 30% of the weight of the composition; and one or more co-solvents for the curable materials.

The composition (also referred to as an ink) is suitable for thermal inkjet printing and so generally has a viscosity of less than about 12 mPa·s, preferably less than about 11 mPa·s, more preferably less than about 6.5 mPa·s at 25° C. In this specification, all viscosities are at 25° C. unless otherwise stated.

The term "single phase" is used to mean that the curable materials are fully in solution, being dissolved in water and co-solvent all being fully missible therewith. No phase separation or settlement occurs. The single phase composition may nevertheless possibly carry other materials in solid form to achieve required application properties. For instance, fine particles of pigment (which are insoluble in the composition) may be carried in dispersion or suspension, often stabilised against flocculation and settling by the use of dispersing agents, to provide colour.

The curable materials harden on curing following exposure to a suitable curing stimulus after printing to form printed material, usually in the form of a film. The materials are typically radiation-curable, curing in expose to exposure to suitable radiation such as ultra violet (UV) heat, infrared or electron beam radiation, with appropriate initiators being used in the composition.

To produce useful compositions capable of being thermally inkjet printed, the water content must be in excess of about 10% as otherwise there is insufficient water for bubble formation and the inkjet cartridge overheats.

By having a water content of less than about 30%, there is no need for a drying step to remove excess water prior to curing. It is found that inks with a water content in the range 10 to 30% can have good jetting performance and produce films with good properties on porous, semi-porous and non-porous substrates without the need for a drying step thus enabling printing speeds to be increased.

The water content of the composition is preferably in the range 10 to 25%, 10 to 21%, yet more preferably 15 to 20%. The water is preferably deionised (DI) water.

The curable materials are typically present in an amount in the range 10 to 90% by weight of the composition, preferably 25 to 80%, more preferably 50 to 70%.

The curable materials preferably comprise a mixture of different curable monomers, typically including acrylate monomers. The different curable materials are preferably chemically distinct, being from different chemical classes, rather than being different grades of the same material, e.g. having different chain lengths, molecular weights etc.

The curable materials preferably include a mixture of acrylate materials of different functionality, selected from monofunctional acrylate, difunctional acrylate and trifunctional acrylate. Materials with different functionality have different properties, e.g. in terms of viscosity, water solubility and film-forming properties in terms of hardness and water resistance, so by using a mixture of materials of different functionality so a composition with a good overall balance of properties can be achieved. The curable acrylate materials are typically present in an amount in the range 40 to 50% by weight of the total weight of the composition.

The curable materials preferably include one or more trifunctional materials, desirably trifunctional acrylate monomers, suitably present in an amount in the range 0.5 to 15% by weight of the composition, preferably 2.5 to 12.5%, more preferably 5 to 10%, possibly in the range 1 to 10%, 1 to 9% or 3 to 9%. Trifunctional acrylates have the benefit of being reactive, so increasing curing rate and cross-linking density, and also having good solvent resistance, giving rise to good film properties in terms of water/chemical resistance, scratch resistance and durability. However, they also have high viscosities and produce films with high shrinkage and low flexibility on curing so are generally unsuitable for use without other curable materials.

The preferred class of trifunctional acrylate monomers is alkoxylated trimethylolpropane tri(meth)acrylates. Materials in this class have reasonable water solubility and produce printed films with good properties, e.g. in terms of hardness and water resistance, but they have relatively high viscosities. The materials in this class may be ethoxylated (EO), propoxylated (PO) etc., with ethoxylated materials generally being preferred as they have greater water solubility. Alkoxylation helps water-miscibility of the material, and also the water sensitivity of the resulting printed film. As the level of alkoxylation increases, hydrophilicity increases with materials being more water compatible and water soluble, with the consequence of producing more water-sensitive prints. Ethoxylated materials are slightly more hydrophilic than propoxylated materials, and ethoxylated materials are generally preferred for this reason. Propoxylated materials function acceptably, but need to be used at lower levels than ethoxylated materials. As the level of alkoxylation increases, viscosity and molecular weight also increase, and it is preferred to use materials having no more than 20 ethylene oxide units (EO20), with lower levels being favoured, typically no more than EO15, no more than EO9, no more than EO6, with the preferred level being EO3. The currently preferred material in this class is trimethylolpropane triacrylate with 3EO units (EO3 TMPTA), having a good balance of properties including viscosity, hydrophilicity and reactivity. This material has good water solubility, fast cure response and low skin irritancy and produces printed films with good properties including good water and solvent resistance and lack of brittleness, i.e. good ductility.

Suitable commercially available UV-curable alkoxylated TMPTA monomers include the following SR and CN materials available from Sartomer, Miramer materials available from Rahn AG and Ebecryl materials available from Cytec Industries (Sartomer, Miramer and Ebecryl are Trade Marks):

EO3 TMPTA (SR 454, Miramer M3130, Ebecryl 160)
EO6 TMPTA (SR 499, Miramer M3160)
EO9 TMPTA (SR502, Miramer M3190)
EO15 TMPTA (SR9035, CN 435)
EO20 TMPTA (SR415)
PO3 TMPTA (SR492)

The curable materials preferably include one or more difunctional materials, desirably difunctional acrylate monomers, suitably present in an amount in the range 1 to 30% by weight of the composites, preferably 5 to 25%, more preferably 10 to 20%, possibly in the range 3 to 18% or 4 to 15%.

The difunctional acrylate preferably comprises one or more glycol di(meth)acrylate, preferably polyalkene glycol di(meth)acrylates. Diacrylates are generally preferred to dimethacrylates as they have faster cure responses (which is advantageous) but higher viscosities (which is disadvantageous). Compared with the triacrylates discussed above, materials in this class have higher water solubility and lower viscosity, but produce softer, more water sensitive films. The term polyalkene is used to include propylene, dipropylene etc. The currently preferred material in this class is dipropylene glycol diacrylate (DPGDA), which has advantages of low viscosity, low volatility and fast cure speed, and produces films with good flexibility, adhesion, hardness and abrasion resistance.

Commercially available UV-curable difunctional acrylates include the following:

Dipropylene glycol diacrylate (DPGDA) (SR508, SR508IJ)
Tripropylene glycol diacrylate (TPGDA) (SR306)
1,6 hexane diol diacrylate (HDDA) (SR238)
Propoxylated (2) neopentyl glycol diacrylate (PONPGDA) (SR903, Ebecryl 145)
Modified diacrylate (Ebecryl 152)
1,3 butylene glycol diacrylate (SR212B)
Neopentyl glycol diacrylate (SR247)
1,3 butylene glycol dimethacrylate (SR297J)
1,4 butanediol dimethacrylate (SR214)
1,6 hexanediol dimethacrylate (SR239A)
Diethylene glycol dimethacrylate (SR231)
Esterdiol diacrylate (SR606A)
Ethylene glycol dimethacrylate (SR206, SR206H)
Tetraethylene glycol diacrylate (SR268US)
Tetraethylene glycol dimethacrylate (SR209)
Tricyclodecane dimethanol diacrylate (SR833S)
Tricyclodecane dimethanol dimethacrylate (SR834)
Triethylene glycol diacrylate (SR272)
Triethylene glycol dimethacrylate (SR205)
1,3 butylene glycol diacrylate (SR212B)
Neopentyl glycol diacrylate (SR247)
Propoxylated neopentyl glycol diacrylate (SR9003IJ)
Difunctional acrylate monomer (SR4423)

The composition conveniently comprises a mixture of trifunctional curable material and difunctional curable material at least, with the difunctional material preferably being present in greater quantity than the trifunctional material, suitably at about twice the amount.

The curable materials desirably include one or more monofunctional materials, desirably monofunctional acrylate monomer, with such materials having the benefit of low viscosity and good wetting properties. Suitable monofunctional acrylate monomers include acrylates and methacrylates etc., with acrylates being preferred. Monofunctional curable material is preferably used in similar or equal amounts to difunctional curable material, as discussed above, namely being present in an amount in the range 1 to 30% by weight of the composition, preferably 5 to 25%, more preferably 5 to 20%, yet more preferably 10 to 20%.

Commercially available UV-curable monofunctional acrylate monomer materials include the following:

Tetrahydrofurfuryl acrylate (THFA) (SR285)
2-(2-ethoxy-ethoxy)ethyl acrylate (EOEOEA) (SR256, Miramer 170)
Tridecyl acrylate (SR489D)
Isodecyl acrylate (SR395)
2-phenoxyethyl acrylate (SR339, Ebecryl 114)
Caprolactone acrylate
Lauryl acrylate (SR335)
Tetrahydrofurfuryl methacrylate
Isobornyl acrylate (SR506)
Octodecyl acrylate (SR484)
Isooctyl acrylate (SR440)
Aliphatic monoacrylate blend (Ebecryl 113)
Alkoxylated THFA (CD611)
Cyclic trimethylolpropane formyl acetate (SR531)

The currently preferred monofunctional acrylate monomers are THFA and EOEOEA.

The composition preferably includes a mixture of trifunctional curable material and monofunctional curable material at least, most preferably a mixture of trifunctional, difunctional and monofunctional curable materials. By using a mixture of materials of different functionality, a good overall balance of properties can be achieved. It will be appreciated that different particular curable materials and mixtures thereof may be better suited for different printing systems, printing applications and/or printing media.

Materials having more than three functionalities can have benefits of increasing cross-linking density, chemical resistance and scratch resistance of printed films, but such materials have high viscosities and so should be used, if present, in low quantities, typically not in excess of 3%, e.g. in the range 1 to 2%. Good results have been obtained by use of a small amount (about 1%) of a hyperbranched polyester acrylate oligomer, particularly selected from those available from Sartomer under the designations CN2300, CN2301 and CN3202, with CN2302 being preferred. This material is a multifunctional dendrimer of generally spherical form having about fifteen functionalities, thus providing very fast surface cure, yet comparatively low viscosity having regard to the number of functionalities. These materials provide a combination of high functionality with low shrinkage, and function well to improve film toughness.

The composition may include one or more curable oligomers, typically in small amounts e.g. in the range 0.1 to 2% by weight of the weight of the composition. Oligomers may be used to adjust various physical properties of the cured printed film, including chemical resistance, flexibility, weatherability, and shrinkage. Suitable oligomers include, but are not limited to: polyesters and acrylics. The CN2300, CN2301 and CN2302 oligomers referred to above are suitable for use under this heading.

The composition desirably further includes one or more curable N-vinyl monomer materials, preferably a mixture of two or more N-vinyl monomer materials. Such materials generally have low viscosities and so act to reduce the viscosity of the composition. The materials also act as curable humectants, helping jetting stability and printing reliability and preventing drying on the nozzles because they are non-volatile. They cure in with the other curable materials, increasing film thickness. Because they cure in with the other materials they do not have to be removed from the print before or after curing. These materials are also found to have beneficial anti-kogation properties. In addition, they function as co-solvents, to be discussed below.

Preferred n-vinyl materials include N-acryloyl morpholine (NAM), N-methyl-N-vinyl acetamide (NMNVAM) and N-vinyl acetamide (NVAM), with it being preferred to use a mixture of NAM together with NNMVAM and/or NVAM. N-vinyl pyrolydone (NVP) is also useful but it is preferred to avoid this material for health and safety reasons.

The N-vinyl monomer materials are typically used in an amount of up to about 50% by weight of the total weight of the composition, typically at levels of 45%, 40%, 35% or less, eg. in the range 10 to 50%, preferably 15 to 45% more preferably 20 to 42%. NAM is conveniently present in an amount in the range 5 to 25%, preferably 10 to 25%, more preferably 15 to 22%, and NMNVAM/NVAM is conveniently present in an amount in the range 1 to 25%, preferably 4 to 20%.

The composition includes one or more co-solvents (curable or otherwise), which function as a solvent for the curable materials together with water. The co-solvent ideally has good compatibility with water and low viscosity. The co-solvent is typically selected from water-soluble organic solvents including alcohols, lactones, imidazolidinones, thiols, ethers and substituted derivatives thereof, etc. Glycol ethers function well as co-solvents, as they have good water compatibility, low viscosities and, high boiling points. Further, glycol ethers function as humectants, preventing drying in print head nozzles. Ethylene glycol monobutyl ether (EGMBE) is particularly preferred. Lactones and imidazolidinones have low viscosities and are also favoured. Suitable co-solvents include, but are not limited to the following: 1,3-dimethyl-2-imidazolidone, 1-methyl-2-imidazolidinone, lactones particularly γ-butyrolactone, isopropyl alcohol (IPA) (which gives good jetting), n-methyl pyrrolidone (NMP), methoxy propyl acetate (MPA) (which has a low viscosity), diacetone alcohol (DAA), methoxy propanol (MeOPr), methyl alcohol, ethyl alcohol, methyl lactate, ethyl lactate, 2-pyrrolidone, 1,4-butanediol, gamma-aminobutyric acid (GABA), dimethyl sulfoxide (DMSO), glycol ethers, particularly propylene glycol n-butyl ether, dipropylene glycol, tripropylene glycol, 2-methyl-1,3-propanediol, propylene glycol methyl ether, propylene glycol ethyl ether, dipropylene glycol methyl ether, dipropylene glycol n-butyl ether, tripropylene glycol methyl ether, tripropylene glycol n-butyl ether, propylene glycol methyl ether acetate, dipropylene glycol methyl ether acetate, propylene glycol n-propyl ether acetate, dipropylene glycol n-propyl ether, ethylene glycol n-butyl ether (or ethylene glycol monobutyl ether (EGMBE)), diethylene glycol n-butyl ether, triethylene glycol butyl ether, diethylene glycol methyl ether, triethylene glycol methyl ether.

As noted above, certain curable monomers may also function as co-solvents, e.g. n-vinyl monomer materials such as N-vinyl acetamide, n-acryloyl morpholine, N methyl-N-vinyl acetamide, etc.

It is preferred not to use low boiling point solvents, having a boiling point below 80° C., except in low amounts, less than about 5%, preferably less than about 3% because of flammability risks, although such materials can impart useful properties. They have very low surface tension so act as wetting agents and give good image quality on certain substrates such as polyethylene, polypropylene, ABS.

Non-curable co-solvent is preferably present in an amount of less than 15% by weight of the composition, more preferably less than 10%, as such mterial is likely to remain in the printed film and could adversely affect film properties. The total amount of co-solvent (curable or otherwise) is typically in the range 20 to 45% by weight of the total weight of the composition, preferably 25 to 40%, more preferably 30 to 40%.

In one particular embodiment of the invention, the composition includes a co-solvent which does not also function as a monomer material. Such a co-solvent may be used in conjunction with a curable monomer material.

In another particular embodiment of the invention, the comparison includes only co-solvent which also functions as a monomer material. Of particular interest are compositions using one or more of N acryloyl morpholine, N vinyl acetamide and N-methyl-N-vinyl acetamide as monomer and co-solvent, possibly without other non-curable co-solvent materials.

In a preferred aspect, the invention provides a single phase aqueous radiation-curable ink composition with reduced aqueous solvent content having a viscosity of less than 11 mPa..s, more preferably less than 6.5 mPa·s at room temperature (25° C.) and suitable for thermal inkjet printing, comprising a mixture of curable materials including at least three curable materials, the curable materials including a monofunctional acrylate, an alkoxylated trimethylolpropane acrylate and a polyalkene glycol acrylate; and one or more co-solvents for the curable materials.

A further aspect of the invention resides in a single phase aqueous radiation-curable ink composition with reduced aqueous solvent content having a viscosity of less than 11 mPas, more preferably less than 6.5 mPas at room temperature (25° C.) and suitable for thermal inkjet printing, comprising a mixture of curable materials including at least three curable materials, the curable materials including a monofunctional acrylate, an alkoxylated trimethylolpropane acrylate, a polyalkene glycol acrylate, and one or more N-vinyl compounds; and one or more co-solvents for the curable materials.

In this aspect, N-acryloyl morpholine, N-vinyl acetamide and N-methyl-N-vinyl acetamide preferably function as both monomer and co-solvent.

In another aspect, the invention provides a single phase aqueous radiation-curable ink composition with reduced aqueous solvent content having a viscosity of less than 11 mPas, more preferably less than 6.5 mPas at room temperature (25° C.) and suitable for thermal inkjet printing, comprising a mixture of curable materials including at least two curable materials and at least two curable N-vinyl monomers.

Mixtures of materials may be used as the co-solvent. One preferred co-solvent comprises a mixture of n-acryloyl morpholine (which is curable, has a high boiling point and reasonable viscosity) and ethylene glycol monobutyl ether (EGMBE). The n-acryloyl morpholine is conveniently present in an amount of about 20% of the weight of the composition and the EGMBE comprises about 6% of the weight composition. A further preferred co-solvent comprises a mixture of 1,3 dimethyl-2-imidazolidinone (in an amount of about 10% of the weight of the composition) and n-acryloyl morpholine (in an amount of about 20% of the weight of the composition).

Viscosity values for various radiation-curable materials are given below:

| Commercial Name | Chemical Name | Viscosity (mPa·s) @ 25° C. |
|---|---|---|
| SR 285 | THFA | 11 |
| SR 454 | EO3 TMPTA | 62 |
| SR 508 | DPGDA | 10 |
| SR 499 | E06 TMPTA | 80 |
| SR 502 | E09 TMPTA | 130 |
| CN 435 or SR 9015 | EO 15 TMPTA | 170 |
| SR 415 | EO 20 TMPTA | 230 |
| NVP | N-vinyl pyrrolidone | 2.4 @ 20° C. |
| MIRAMER 170 | EOEOEA | 12 |
| MIRAMER 3130 | EO3 TMPTA | 60 |
| MIRAMER 3160 | E06 TMPTA | 100 |
| MIRAMER 3190 | E09 TMPTA | 130 |
| CN2302 | Hyperbranched polyester acrylate oligomer | 300 |
| CN2303 | Hyperbranched polyester acrylate oligomer | 350 |
| EBECRYL 113 | Aliphatic monoacrylate | 120 |
| EBECRYL 114 | 2 phenoxy ethylacrylate | 10 |
| EBECRYL 145 | PONPGDA | 20 |
| EBECRYL 152 | Modified diacrylate | 20 |
| EBECRYL 160 | EO3 TMPTA | 80 |
| NAM | N-acryloyl morpholine | 12 |
| NVC | N-vinyl caprolactam | Solid |
| SR 484 | Octodecyl acrylate | 4 |
| SR 395 | Isodecyl acrylate | 5 |
| SR 440 | Isooctyl acrylate | 5 |
| SR 256 | 2-(2-ethoxyethoxy) ethyl acrylate | 6 |
| SR 285 | Tetrahydrofurfuryl acrylate | 6 |
| SR 335 | Lauryl acrylate | 6 |
| SR 489D | Tridecyl acrylate | 7 |
| SR 506 | Isobornyl acrylate | 8 |
| SR 212B | 1,3-tmtylene glycol diacrylate | 9 |
| SR 238 | 1,6 hexanediol diacrylate | 9 |
| SR 508IJ | dipropylene glycol diacrylate | 10 |
| SR 247 | Neopentyl glycol diacrylate | 10 |
| CD 611 | alkoxylated tetrahydrofurfuryl acrylate | 11 |
| SR 339 | 2-Phenoxyetriyl acrylate | 12 |
| SR 531 | Cyclic trimethylolpropane formyl acrylate | 13 |
| SR 9003IJ | Propoxylated neopentyl glycol diacrylate | 15 |

A further aspect of the invention provides a single phase aqueous radiation-curable ink composition with reduced aqueous solvent content having a viscosity of less than 11 mPas, more preferably less than 6.5 mPas at room temperature (25° C.) and suitable for thermal inkjet printing, comprising one or more curable materials; one or more co-solvents for the curable materials; and an anti-kogation agent selected from N-vinyl acetamide (NVAM), N-methyl-N-vinyl acetamide (NM-NVAM), and mixtures thereof.

Good results have been obtained with an anti-kogation agent comprising a mixture of N-vinyl acetamide and N-methyl-N-vinyl acetamide.

The composition optionally includes surfactant in small amount (say up to 3% by weight) to improve wetting. Suitable surfactants can be selected having regard to the substrate on which the composition is to be printed. Suitable surfactants include the following:

| Commercial name | Chemical details | Supplier |
|---|---|---|
| BYK 333 | Polyether modified poly-dimethylsiloxane | BYK Chemie GmbH |
| BYK 381 | Ionic solution of polyacrylic copolymer | BYK Chemie GmbH |
| BYK 307 | Polyether modified poly-dimethylsiloxane | BYK Chemie GmbH |
| BYK 320 | Polyether modified polymethylalkylsiloxane | BYK Chemie GmbH |
| FC 4430 | Fluorosurfactant | 3M |
| FC 4432 | Fluorosurfactant | 3M |
| Zonyl FSN | Fluorosurfactant | Du Pont (UK) Limited |
| Dynol 604 | Non-ionic acetylenic glycol-based surfactant | Air Products |
| Surfadone LP 100 | N-Octyl-2-pyrrolidone | ISP |
| Surfynol 2502 | Acetylenic glycol-based surfactant | Air Products |
| Tego Glide 410 | Polyoxylalkyl ($C_2$-$C_4$) poly-dimethylsiloxane | Degussa AG |
| Tego Glide 100 | Polyether siloxane copolymer | Degussa AG |
| Tego Flow 425 | Polyoxylalkyl ($C_2$-$C_4$) poly-dimethylsiloxane | Degussa AG |
| Tego Protect 5000 | Modified poly-dimethylsiloxane | Degussa AG |
| Tego Protect 5100 | Silicone-modified polyacrylate-resin | Degussa AG |
| Tego Twin 4000 | siloxane-based gemini surfactant | Degussa AG |
| Tego Wet KL 245 | Polyether siloxane copolymer | Degussa AG |
| Tego Wet 510 | Non-ionic organic surfactant | Degussa AG |
| Tego Wet 500 | Non-ionic organic surfactant | Degussa AG |

-continued

| Commercial name | Chemical details | Supplier |
| --- | --- | --- |
| Tego Wet 270 | Polyether siloxane copolymer | Degussa AG |
| Tego Wet 265 | Polyether siloxane copolymer | Degussa AG |
| Tego Twin 4000 | Siloxane-based gemini surfactant | Degussa AG |
| Easy Wet 20 | An organic polymer blend | ISP |
| Envirogem AD01 | Gemini surfactant | Air Products |

(BYK, Dynol, Surfadone, Surfynol, Easy Wet, Envirogem, Zonyl and Tego are Trade Marks.)

Surfactants e.g. Tego Glide 410 Wet 425, Tego 510, e.g. in amounts of about 0.1% by weight, and Tego Protect 5000 and Tego Protect 5100 in amounts of 2.8 to 3.0% by weight have been found to give good results.

Coating and ink additives as anti-kogation agents e.g. Tego Protect 5000 and Tego Protect 5100, e.g. in amounts of 2 to 3% by weight, are currently favoured.

The composition optionally includes coating and ink additives for use as anti-kogation agents in small amount (say up to 3% by weight) to prevent drying in the printhead nozzles. These anti-kogation agents ideally have good compatibility with water, low viscosity and good anti-puddling properties. Suitable coating and ink additives for use as anti-kogation agents include, but are not limited to the following from Degussa AG: Tego Flow ATF 2 (anti-crater and flow additive), the slip and flow additives (Tego Glide A115, Tego Glide 410, Tego Glide 432, Tego Glide 435, Tego Glide 440 and Tego Glide 482), the release additives (Tego Rad 2600 and Tego Rad 2700), the solvent-based binders for production of release coatings (Silikoftal non-stick 60 and Silikophen 300), the linear organofunctional polysiloxanes (Tegomer A-Si 2322, Tegomer C—Si 2142 and Tegomer C—Si 2342), (Tegomer D-3123 (polyether diol), the modified poly-dimethylsiloxane resins for the production of solvent-based anti-graffiti coatings (Tego Protect 5000 and Tego Protect 5100), and the silicone-polyacrylate resins for the production of solvent-based anti-graffiti coatings (Tego Protect 5001 and Tego Protect 5002). (Tego, Silikophen, Silikoftal and Tegomer are Trade Marks).

The term "radiation-curable" refers to functionality directly or indirectly pendant from a surface-treated particle, monomer, oligomer, polymer, or other constituent (as the case may be) that participate in polymerization and/or crosslinking reactions upon exposure to a suitable source of curing energy. Such functionality generally includes not only groups that cure via a cationic mechanism upon energy exposure but also groups that cure via a free-radical mechanism. Representative examples of radiation-curable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free-radically polymerizable groups are preferred. Of these, (meth)acryl moieties are most preferred. The term "(meth)acryl", as used herein, encompasses acryl and/or methacryl.

The energy source used for achieving polymerization and/or crosslinking of the curable functionality may be actinic (e.g. radiation having a wavelength in the ultraviolet or visible region of the spectrum), accelerated particles (e.g. electron beam radiation), thermal (e.g. heat or infrared radiation), or the like. Preferably, the energy is actinic radiation, because such energy provides excellent control over the initiation and rate of polymerization and/or crosslinking. Additionally, actinic radiation can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include lasers, electron beams, mercury lamps, xenon lamps, carbon arc lamps, tungsten filament lamps, sunlight, low intensity ultraviolet light (UV), and the like. The use of UV light for polymerization tends to form higher molecular weight polymers as compared to many other kinds of curing energy. Accordingly, when it is desired to form higher molecular weight materials upon curing, the use of UV light is preferred.

The ink composition typically includes a suitable initiator, either alone or in combination of two or more, appropriate to the curable materials, e.g. a thermal initiator, photoinitiator etc. Suitable initiators are well known to those skilled in the art, as are suitable levels of use (typically less than about 6% by weight).

"Free-radical" UV polymerization, and involves one of two mechanisms, Norrish Type I and Norrish Type-II reactions. In a Norrish Type I reaction, a photoinitiator includes an electron attractive group. When UV light is absorbed, the molecule breaks to form a very unstable, highly reactive free radical that attacks double bonds in the curable material and starts the polymerization. In a Norrish Type II reaction, the UV ionizes the photoinitiator molecule, and this ionized molecule attaches to a coinitiator molecule and activates the coinitiator to form a free radical that attacks the double bonds in the curable material and starts the polymerization. This two-step process requires less LTV energy than the single-step Norrish Type I reaction. Examples of initiators include, but are not limited to: organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl) phosphine oxide, etc. Suitable examples of the Norrish Type I initiators include, but are not limited to: Irgacure 2959, 184, 651, 127, 1800, 819, Darocur 1173, TPO, (Ciba Specialty Chemicals), and Esacure KT046, KIP150, 75 LT, KIP IT, KIP 100F, KIP EM, DP 250, KT37, EDB, H-Nu 470, H-Nu 470X, (Lamberti S.p.A) etc. (Irgacure, Darocur and Esacure are Trade Marks). Suitable examples of the Norrish Type II photoinitiators include, but are not limited to: the thioxanthone initiators of: Esacure TZT, TZM, Speedcure DETX, Speedcure ITX, Speedcure CTX, Speedcure CPTX (Lambson Fine Chemicals Ltd.) etc.; and include, but are not limited to the benzophenone (Type II) initiators of: Speedcure Benzophenone, Speedcure PBZ, Speedcure MBP, Speedcure MBB, Speedcure BMS and Speedcure BEM (Lambson Fine Chemicals Ltd.) etc. (Speedcure is a Trade Mark).

For example, in some embodiments, different photoititiators (and/or coinitiators) may be used to cure the surface and the bulk of the printed fluid. Examples of suitable coinitiators include, but are not limited to, N-371 reactive amine coinitiator CN-386 reactive amine coinitiator, CN-372 reactive amine coinitiator, CN-384 reactive amine coinitiator, CN-383 reactive amine coinitiator, and CN-373 reactive amine coinitiator, all from Sartomer.

Examples of thermal initiators include, but are not limited to: VA 044 (2,2'-azobis [2-(2-imidazolin-2-yl)propane]dihydrochloride), VA 057 (2,2'-azobis[N-(2-carboxyethyl)-2-methylpropioamidine]), VA 060 (2,2'-azobis{2-[1-(2-hydroxyethyl)-2-imidazolin-2-yl]propane}dihydrochloride), VA 061 (2,2'-azobis[2-(2-imidazolin-2-yl)propane]), VA 067 (2,2'-azobis(1-imino-1-pyrrolidino-2-ethylproprane)dihydrochloride), VA 080 (2,2'-azobis{2-methyl-N-[1,1-bis(hydroxymethyl)-2-hydroxyethyl]propionamide}), and VA 086 (2,2'-azobis[2-methyl-N-(2-hydroxyethyl)propionamide]) from Wako Chemicals. Some curable materials will cure without the presence of an initiator, e.g. in response to exposure to an electron beam (known as e-beam curing).

The free-radical initiator conveniently comprises at least one of: benzophenone, trimethylbenzophenone, methylbenzophenone, 2-hydroxy-2-methyl-1-phenyl-1-propanone, benzyl dimethyl ketal, isopropyl thiooxanthone, 1-hydroxycyclohexyl-phenyl-ketone, ethyl 4-(dimethylamino)benzoate, 2-methyl-1-[4-(methylthio)phenyl]-2-morpholinopropan-1-one, 2-benzyl-2-(dimethylamino)-1-[4-(4-morpholinyl)phenyl]-1-butanone, 2,2-dimethoxy-1,2-diphenylethan-1-one, phosphine oxide, phenyl bis(2,4,6-trimethylbenzoyl)phosphine oxide, 2-dimethylamino-2-(4-methyl-benzyl)-1-(4-morpholin-4-yl-phenyl)-butan-1-one), amine acrylate, acrylic ester, trimethylbenzoyldiphenylphosphine oxide, a-hydroxyketones, and benzophenone derivatives.

The ink composition may include an optional stabiliser such as hydroquinone, methyl hydroquinone, Irgastab UV10, Irgastab UV22, Genorad 16, Genorad 18 or Genorad 22 (Irgastab and Genorad are Trade Marks).

The ink composition may be used as is, e.g. to print a clear coating or layer or film on a substrate. Alternatively, the composition may be used as a vehicle e.g. for carrying a dye in solution or a dispersed pigment in known manner for printing of text or images. The term colorant as used herein may refer to just a colorant, or it may refer to a colorant in combination with, for example, a dispersant of some kind. The colorants used herein are dyes or pigments, more preferably pigments. The colorant may be any colour, but preferably the colorant is cyan, magenta, yellow or black. The colouring agent generally comprises a colourant which may be self-dispersed, polymer-dispersed or surfactant-dispersed. When the colorant is self-dispersed the colorant is synonymous with the colouring agent. Self-dispersed pigment refers to pigments that have been chemically modified with a charge or a polymeric group, wherein the chemical modification aids the pigment in becoming and/or substantially remaining dispersed in a liquid vehicle. When the pigment is a self-dispersing pigment the charging moiety is covalently-linked to the pigment. Surfactant-dispersed pigment refers to pigments that utilize a surfactant dispersant to aid the pigment in becoming and/or substantially remaining dispersed in a liquid vehicle. The pigment dispersion should contain enough dispersant to stabilize the pigment particle dispersion, but not so much as to adversely affect properties of the dispersion such as viscosity, stability, and optical density. The colorant may be chosen from a wide range of conventional colorants, preferably pigments. Preferably, the pigment is a white pigment, a black pigment, a blue pigment, a brown pigment, a cyan pigment, a green pigment, a violet pigment, a magenta pigment, a red pigment, or a yellow pigment, or shades or combinations thereof. Suitable classes of coloured pigments include, for example, anthraquinones, phthalocyanine blues, phthalocyanine greens, diazos, monoazos, pyranthrones, perylenes, heterocyclic yellows, quinacridones, diketopyrolopyroles, and (thio)indigoids. Such pigments are commercially available in either powder or press cake form from a number of sources including, BASF Corporation, Engelhard Corporation and Sun Chemical Corporation. Examples of other suitable coloured pigments are described in the Colour Index, 3rd edition (The Society of Dyers and Colourists, 1982).

For the printing of black text or images it is appropriate to use aqueous dispersions of oxidized carbon black pigment, such as the easily dispersible NIPex and Special Black ranges of pigments (Degussa AG). Special Black 250 (Degussa AG), which finds particular application in radiation-cured printing inks, is preferred. (NIPex is a Trade Mark).

Preferably, in embodiments of the invention where pigments are used, the pigment particle size is as small as possible to enable a stable dispersion of the particles in the liquid vehicle and to prevent clogging of the ink channels or nozzle when the ink is used in an inkjet printer. Preferred particle average diameters are generally from about 0.001 to about 0.5 microns, although the particle size can be outside this range in specific embodiments. Preferably, at least 70% of the pigment particles should have an average particle diameter of less than about 150 nm for carbon blacks and less than about 250 nm for colour pigments.

In embodiments including pigment, the composition preferably includes at least one dispersant in small amount (say up to 1% by weight) to improve dispersion of the pigment during milling. Suitable dispersants include, but are not limited to the following:

| Commercial name | Chemical details | Supplier |
|---|---|---|
| Solsperse 20,000 | Dispersant | Noveon Inc. (Lubrizol) |
| Solsperse 12,000 | Synergist | Noveon Inc. (Lubrizol) |
| Tego Dispers 650 | Specially-modified polyether | Degussa AG |

(Solsperse and Tego are Trade Marks.)

Dispersants e.g. Solsperse 20,000 in an amount in the range 0.5 to 0.20% by weight, together with the synergist Solsperse 12,000 in an amount in the range 0.01 to 0.10% have been found to give good results.

When dyes are used in the inkjet inks of the invention, any suitable commercially available dye may be used to impart the desired colour characteristics to the inkjet ink. Suitable anionic and cationic dyes are well known for use in inkjet inks, and include, but are not limited to the examples listed herein. Most inkjet ink dyes are anionic; however, cationic dyes may also be used. Anionic dyes are those in which a negative charge is localized on one atom or spread over the entire molecule. Cationic dyes are those in which a positive charge is localized on one atom or spread over the entire molecule.

Specific examples of anionic dyes include Bernacid Red 2BMN, Pontamine Brilliant Bond Blue A, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLI (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Cone A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P—N, Procion Blue MX-R, Procion Blue MX-4GD, Procion Blue MX-G, and Procion Blue MX-2GN, all available from ICI Americas; Cibacron Red F—B, Cibacron Black BG, Lanasol Black B, Lanasol Red 5B, Lanasol Red B, and Lanasol Yellow 46.

Examples of additional suitable dyes include, but are not limited to, anthraquinones; monoazo dyes; diazo dyes; phthalocyanines; aza[18] annulenes; formazan copper complexes; Bernacid Red (Berncolors, Poughkeepsie, N.Y.); Pontamine Brilliant Bond Blue; Berncolor A. Y. 34; Telon Fast Yellow 4GL-175; Basacid Black SE 0228 (BASF); the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132); Pro-Jet Fast Yellow, Cyan and Magenta (Zeneca Inc.); Aminyl Brilliant Red F—B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like. Examples of cationic dyes include the following from Crompton & Knowles Corp: Sevron Yellow L200 200%, Sevron Brilliant Red 4G 200%, Sevron Brilliant Red B 200%, Sevron Blue 2G, Sevron Black B1, Basic Black PSr, and Basic Black RX. Other cationic dyes may also be suitable for use in this invention.

In embodiments of the invention where dyes are used, the dye is present in the inkjet ink composition in any effective amount to provide a desired colour. Typically the dye is present in an amount of from about 1 to about 5% by weight of the ink composition, and preferably from about 1 to about 3% by weight (wherein the amount refers to an amount of dye molecules present in the ink), although the amount can be outside this range. A mixture of dyes in the proportions desired to obtain a specific shade may also be employed. Similarly, in embodiments of the invention where pigments are used, the pigment may be present in the inkjet ink composition in any effective amount. Typically, the pigment is present in an amount of from about 1% to about 10% by weight of the ink composition and preferably from about 1% to about 5% by weight, although the amount can be outside of this range. Where both dyes and pigments are incorporated into the inkjet ink composition, the weight percentage of the combined colorant may be adjusted accordingly.

It will also be appreciated by those skilled in the art that other functional compositions suitable for inkjet printing are also possible for use in the present invention in place of a colourant. Particulate matter such as those suitable for use in preparing conductive regions e.g. Cu, Ag, Au, and alloys of such, and those suitable for use in preparing magnetic regions e.g. Fe and Co, and alloys of such, are also possible for use in the present invention.

In addition, if necessary, additives such as pH adjusting agents, rust preventives, fungicides, antioxidants, evaporation accelerators, chelating agents, and water-soluble polymers other than the above described components, may be added into the inks used in the present invention.

Further details of conventional and optional ingredients for printing inks and their use are given, e.g. in U.S. Pat. No. 6,294,592.

Compositions in accordance with the invention can have minimal fluctuation of viscosity, excellent stability of components and can be free from deterioration of dispersibility (for dye-based inks).

The compositions of the invention are used in conventional manner, using a thermal inkjet printer. The compositions are printed onto the intended substrate and exposed to an appropriate curing regime depending on the nature of the curable materials, e.g. involving exposure to UV light, heat, etc.

The compositions may be printed onto a variety of substrates, including porous, semi-porous and non-porous substrates, including non-porous substrates such as ceramics, rubbers, metals, plastics (e.g. polyesters such as polyethylene terephthalate (PET), polyethylene, low density (LD) polyethylene, orientated polystyrene, high density (HD) polyethylene, acrylonirile butadiene styrene (ABS), polypropylene, polyvinyl chloride (PVC), polycarbonate, PMMA, polyimide film) etc. and porous/semi-porous substrates such as paper, card etc.

Even on difficult to handle non-porous substrates, the invention can provide compositions that are fast drying and produce good quality prints of high durability with good adhesion to the substrate. In particular, the resulting prints may satisfy the requirements of good scratch resistance, water-fastness, flexibility and optical density (for coloured inks). The compositions find particular application in industrial printing onto non-porous substrates and semi-porous substrates.

It is seen then that there is a particular need for a thermal inkjet ink capable of printing on non-porous substrates to produce images with good adhesion to these surfaces that is resistant to moisture and wet rub. It would further be desirable to develop an ink with high moisture tolerance that does not cause corrosion of the printhead. This need is met by the ink composition according to the present invention, wherein enhancement in permanence and adhesion of the ink to non-porous substrates is achieved.

According to a preferred aspect of the present invention, there is provided a pigment dispersion comprising: at least one pigment having an average particle diameter of 150 nm or less; and a dispersion medium containing as major components at least three radiation-curable oligomers, at least one curable monomer, and at least one dispersant and one synergist, having a combined viscosity of less than 30 mPa·s at a temperature of 25° C.; wherein the mixing ratio of the pigment is confined within the range of 1 to 5% by weight based on a total weight of the ink composition.

According to another preferred aspect of the present invention, there is provided a single-phase radiation-curable liquid ink precursor having a viscosity of less than 11 mPa·s, more preferably less than 6.5 mPa·s at room temperature (25° C.) and suitable for thermal inkjet printing, comprising a pigment dispersion which comprises at least one pigment having an average particle diameter of 150 nm or less; and a dispersion medium containing as major components at least three radiation-curable oligomers, at least one curable monomer, and at least one dispersant and one synergist, having a combined viscosity of less than 30 mPa·s at a temperature of 25° C., and further containing water, at least one free-radical initiator, at least one or more curable monomers, and one or more co-solvents for the curable materials, and optionally containing one or more surfactants; wherein the mixing ratio of the pigment is confined within the range of 1 to 5% by weight based on a total weight of the ink composition.

In a further aspect, the invention provides a single phase aqueous curable composition suitable for thermal inkjet printing, comprising water in an amount not exceeding 35% by weight of the weight of the composition, and one or more curable materials. Water is preferably present in an amount not exceeding 30% by weight. Water is preferably present in an amount of at least 10% by weight.

The invention will be further described, by way of illustration, in the following Examples.

EXAMPLES

In the Examples all the quantities are % by weight and all viscosities are at 25° C. unless otherwise specified.

Viscosity measurements were performed using a Brookfield DV-II+ viscometer operating with a rotational speed of 60 rpm at a temperature of 25° C. Briefly, 17.5 ml of ink was transferred to the chamber, to which a suitable spindle was then lowered into the chamber and left until the temperature stabilized. Measurements were taken every 30, 60, 120 and 300 seconds, until a reproducible viscosity reading could be obtained. [Units: 1 mPa·s 1 cP]

The following radiation-curable ink formulations were made from the listed ingredients given in Tables 1, 2 and 3 below. All of the inks in accordance with the invention are in the form of single-phase aqueous radiation-curable compositions, formulated either as a clear ink or as an ink carrying a dispersed pigment or a dissolved dye.

TABLE 1

| Composition | NJ049 | NJ000 | MOSS | HJM-101508 | HJM-030308 | NJ077 | NJ080 | NJ082 | HM79 | NJ018 (Comp) |
|---|---|---|---|---|---|---|---|---|---|---|
| SR 454 | 9.0 | 7.20 | 6.0 | 7.45 | 8.2 | 6.54 | 6.96 | 7.13 | 6.20 | 10 |
| SR 285 | 18.0 | 14.4 | 12.0 | 15.2 | 16.4 | 13.1 | 13.95 | 14.28 | 14.60 | 25 |
| SR 508 | 18.0 | 14.4 | 12.0 | 15.2 | 16.4 | 13.1 | 13.95 | 14.28 | 14.60 | 25 |
| NAM | 20.0 | 18.00 | 20.0 | 19.00 | 20.5 | 16.27 | 17.34 | 17.75 | 24.80 | 10 |
| Solsperse 20,000 | — | 0.5 | — | 0.5 | 0.12 | 0.18 | 0.18 | 0.18 | 1.25 | |
| Solsperse 12,000 | — | 0.05 | — | 0.05 | 0.06 | 0.09 | 0.08 | 0.09 | 0.08 | |
| Special Black 250 | — | 2.0 | — | 1.9 | 1.5 | 2.15 | 2.13 | 2.13 | 2.00 | |
| Irgacure 2959 | 5.0 | 3.2 | 5.0 | 2.5 | 4.6 | 2.8 | 2.85 | 1.87 | 3.20 | 3 |
| Irgacure 819 | — | 2.65 | — | 2.2 | — | 2.4 | 2.45 | 1.37 | 2.00 | 2 |
| VA086 | — | — | — | — | — | — | — | 1.92 | — | |
| EGMBE | — | 4.5 | 5.0 | 4.5 | 4.6 | 4.87 | 5.58 | 4.49 | 6.20 | 10 |
| DI Water | 15.0 | 19.5 | 20.0 | 19.8 | 18.5 | 19.09 | 17.37 | 19.25 | 19.60 | 5 |
| NM-NVAM | 15.0 | 9.4 | 10.0 | 9.9 | 9.2 | 9.24 | 9.13 | 8.98 | — | 5 |
| NVAM | — | 4.0 | — | 1.8 | — | 9.99 | 8.09 | 6.08 | 5.00 | 5 |
| Tego Glide 410 | — | 0.1 | — | — | — | — | — | — | 0.1 | |
| Tego Flow 425 | — | 0.1 | — | — | — | — | — | — | 0.1 | |
| Tego 510 | — | — | — | — | — | 0.12 | — | 0.13 | — | |
| BYK 307 | — | — | — | — | — | 0.12 | — | 0.14 | — | |
| Genorad 18 | — | — | — | — | — | — | — | — | 0.25 | — |
| Viscosity (cP) | 7.7 | 8.6 | 7.8 | 10.7 | 7.61 | 7.75 | 7.92 | 7.93 | 9.8 | 8.5 |
| Wet rub resistance (water) | 3 | 5 | 4 | 5 | 4 | 5 | 5 | 5 | 5. | 3 |
| Scratch resistance | 4 | 5 | 4 | 5 | 4 | 5 | 5 | 5 | 5 | 4 |
| pH performance | Exclnt 5 | Exclnt 5 | Exclnt 5 | Exclnt 5 | Exclnt 5 | Exclnt 5 | Exclnt 5 | Exclnt 5 | Exclnt 5 | over heating loses jets 1 |

Exlnt is an abbreviation for excellent

TABLE 2

| Composition | NJ094 | HJM-040408 | NJα (Comp) | NJβ (Comp) | NJγ | NJδ | NJ2 | NJ3 | NJ4 |
|---|---|---|---|---|---|---|---|---|---|
| SR 454 | 7.36 | 7.90 | 0.87 | 0.87 | 6.93 | 6.93 | 9.87 | 9.74 | 9.00 |
| SR 285 | 14.71 | 15.8 | 10.0 | 10.0 | 13.86 | 13.26 | 19.74 | 19.47 | — |
| SR 508 | 14.71 | 15.8 | 10.0 | 10.0 | 13.86 | 13.26 | 19.74 | 19.47 | 18.0 |
| SR 415 | — | — | 4.13 | 4.13 | — | — | — | — | — |
| NAM | 21.02 | 19.6 | 17.79 | 17.79 | 17.42 | 16.67 | 17.48 | 17.44 | 20.0 |
| MIRAMER 170 | — | — | — | — | — | — | — | — | 18.0 |
| CN 2302 | — | — | — | — | — | — | 1.0 | 0.98 | 1.0 |
| Solsperse 20,000 | — | 0.05 | 0.14 | 0.14 | 0.17 | 0.16 | — | — | — |
| Solsperse 12,000 | — | 0.01 | 0.07 | 0.07 | 0.09 | 0.08 | — | — | — |
| Special Black 250 | — | 1.50 | 1.69 | 1.69 | 2.14 | 2.04 | — | — | — |
| Orasol Black RLI | 1.77 | 2.80 | — | — | — | — | — | — | — |
| Irgacure 2959 | 4.48 | 3.27 | 3.35 | 3.35 | 3.11 | 2.97 | — | 4.96 | 5.0 |
| Darocur TPO | 4.01 | — | 1.88 | 1.88 | 2.62 | 2.51 | 2.40 | 3.05 | 2.0 |
| EGMBE | 6.85 | 3.27 | 7.88 | 7.88 | 4.37 | 4.18 | 5.02 | 5.11 | — |
| DI Water | 20.88 | 20.10 | 31.47 | 31.47 | 19.03 | 18.20 | 14.81 | 14.87 | 14.5 |
| Isopropyl alcohol | — | — | 2.98 | 2.98 | — | — | — | — | — |
| 1,3 dimethyl-2-imidazolidinone | — | — | — | — | — | — | — | — | 10.0 |
| NM-NVAM | — | 9.70 | — | — | 9.22 | 8.82 | — | — | — |
| NVAM | 4.27 | — | 4.91 | 4.91 | 4.08 | 8.08 | 5.05 | 4.97 | 2.50 |
| Tego Glide 410 | — | — | — | — | 0.10 | 0.09 | — | — | — |
| Tego Flow 425 | — | — | — | — | 0.10 | 0.09 | — | — | — |
| Tego Protect 5000 | — | — | 2.84 | — | 2.93 | 2.95 | — | — | — |
| Tego Protect 5100 | — | — | — | 2.84 | — | — | — | — | — |
| Viscosity (cP) | 10.9 | 11.4 | 7.90 | 7.60 | 8.60 | 8.60 | 8.95 | 9.45 | 9.20 |
| pH performance | 5 | 5 | 5 | 5 | 5 | 5 | | | |
| Scratch resistance | 5 | 5 | 3 | 3 | 5 | 5 | | | |
| Wet rub resistance (water) | 5 | 5 | 2 | 2 | 5 | 5 | | | |

TABLE 3

| Composition | Ink 3 | Ink 9 |
|---|---|---|
| SR 256 | 20.5 | — |
| SR 238 | — | 23.5 |
| SR 454 | 20.5 | — |
| SR 499 | — | 23.5 |
| NAM | 15 | 15 |
| NVAM | 5 | 5 |
| NMNVAM | 10 | 10 |
| Water | 18 | 12 |
| γ butyrolactone | — | 5 |
| 1,3-dimethyl 2 imidazolidinone | 5 | |
| Irgacure 2959 | 3 | 3 |
| Darocur TPO | 3 | 3 |
| Viscosity (CP) | 8.3 | 11.1 |
| Appearance | single phase | single phase |
| Wet rub resistance (water) | 16 | 20 |
| Inkjet printing | good | good |

Inks NJ018, NJα and NJβ are comparative examples indicated by "Comp", having unsuitable quantities of water. NJ018 has insufficient water, and caused overheating of the inkjet cartridge. NJα and NJβ have too much water and had unacceptable wet rub resistance properties.

The various performance ratings given in Tables 1 and 2 are rated subjectively on a scale of 1 to 5, with 5 being best, with scratch resistance and wet rub resistance being for prints on white Melinex polyester substrate (Melinex is a Trade Mark), a non-porous material.

In Table 3, wet rub resistance values are the number of rubs of a print on Melinex with a wet lint-free wipe, with moderate pressure applied, before any removal was observed.

The exemplified inks were prepared by mixing the liquid curable materials and photoinitiators, to produce a UV-curable mixture (referred to as part A). Solid materials, particularly N-vinyl acetamide and N-methyl-N-vinyl acetamide, were dissolved in water and co-solvent to produce a second mixture (referred to as part B). Parts A and B were mixed together along with remaining ingredients, namely surfactant, wetting agents etc. and with dye or pigment dispersion, if present.

The inkjet inks of the present invention can be prepared by any process suitable for preparing aqueous-based inks. The pigmented ink is prepared by premixing the selected pigment(s) and dispersant in water. In the case of dyes, some of the same factors apply except that there is no dispersant present and no need for pigment deaggregation. The dye-based ink is prepared in a well-agitated vessel rather than in dispersing equipment. Co-solvents may be present during the dispersion. The dispersing step may be accomplished in a horizontal mini mill, a ball mill, or an attritor. It is generally desirable to make the pigmented inkjet ink in concentrated form. The concentrated pigmented inkjet ink is subsequently diluted to the appropriate concentration for use in the inkjet printing system. This technique permits preparation of a greater quantity of pigmented ink from the equipment. If the pigment dispersion is made in a solvent, it is diluted with water and optionally other solvents to obtain the appropriate concentration. If the pigment dispersion is made in water, it is diluted with either additional deionised water or water-soluble solvents to make a pigment dispersion of the desired concentration. By dilution, the ink is adjusted to the desired viscosity, colour, hue, saturation density, and print area coverage for the particular application.

Pigmented Thermal Inkjet Inks

In a preferred method, the pigmented inks were prepared according to the following procedure.

Pigment Dispersion

A typical mill base (i.e. dispersion medium) was prepared by mixing the following radiation-curable materials: SR 508 (26.7%), SR 454 (13.3%), SR 285 (26.7%) and n-acryloyl morpholine (33.3%) in a high shear mixing apparatus. The mill base mixture was used to produce a pigment dispersion comprising 77.6% of the mixture, 1.6% Solsperse 20,000 dispersant, 0.8% Solsperse synergist and 20% Special Black 250 pigment. The dispersant and synergist were added to the mill base mixture, and the combined solution high shear mixed for 10 minutes. Special Black 250 pigment (Degussa AG) was then added to the solution and the entire mixture was high shear mixed for a further 10 minutes. The solvent-dispersed pigment was then milled using an Eiger bead mill operating in recirculating mode at 25° C. at a rate of 4000 rpm for 4 hours (Eiger is a Trade Mark). The milling media used was 0.1 to 1.0 µm ceramic beads. The pigment particle size attained was <150 nm.

Liquid Inkjet Ink Precursor

Pigmented inkjet inks were prepared by adding the various components in Tables 1 and 2 to the pigment dispersion according to the compositions.

In a typical embodiment, part A was made by mixing DPGDA 6.66 parts, SR285 6.66 parts, SR454 2.81 parts, NAM 11.33 parts, Irgacure 819 0.98 parts, and Irgacure 2959 1.56 parts. Part B was made by mixing water 12.74 parts, EGMBE 3.97 parts and NVAM 3.29 parts. Ink was made by mixing dispersion 5 parts, part B 14.22 parts, part A 30.68 parts, Tego glide 410 0.05 parts and Tego 425 0.05 parts. The resulting ink was then filtered (Whatman GF/B glass microfibre filter, 1 µm) (Whatman is a Trade Mark) to give a final ink suitable for thermal inkjet printing.

Dye-Based Thermal Inkjet Inks

In a preferred method, the dye-based inks were prepared according to the following procedure.

A typical dye-based thermal inkjet ink was prepared by mixing the following radiation-curable materials: SR 508 (26.7%), SR 454 (13.3%), SR 285 (26.7%) and n-acryloyl morpholine (33.3%) in a high shear mixing apparatus. To a 32.4% portion of this mixture was added Irgacure 2959 (4.41%), Darocur TPO (4.01%), NAM (2.66%), EGMBE (6.85%), water (20.88%) and NVAM (4.27%), and the combined solution high shear mixed for a further 10 minutes. Orasol Black RLI (1.77%, Ciba-Geigy) was then added to the solution and the entire mixture was high shear mixed for a final 10 minutes at room temperature (25° C.). The resulting ink was then filtered (Whatman GF/B glass microfibre filter, 1 µm) to give a final ink suitable for thermal inkjet printing.

The compositions were printed onto a range of different substrates at 600×600 dpi from a Wolke (Wolke is a Trade Mark) printer, or from one of the following Hewlett Packard desktop printers: HP 6127 and HP 850, using an HP45A cartridge (with capacity 43 ml ink). The printed material was cured by exposure to UV from a 500 W Fusion Light Hammer 6 system with an 'H' bulb, more preferably a 'D' bulb, being conveyed below the UV system at a line speed of 30 m/min. (Fusion Light Hammer 6 is a Trade Mark). There was no need for a pre-curing drying step.

Preferred compositions include HM79 and NJ000. As well as having excellent jetting reliability and wet-fastness, they also shows good start-stop performance (i.e. where a cartridge can be left idle after a period of continuous printing and on re-starting printing is readily recoverable). No significant material was deposited onto the printhead heaters after printing four full cartridges of these compositions.

The ink compositions in accordance with the invention were tested on a wide range of substrates of non-porous, semi-porous and porous materials, and were found to give good quality prints of high durability with good adhesion to the substrate. The prints had good scratch resistance, good resistance to water and other solvents, good flexibility and good optical density (for coloured inks).

Performance data for composition HM79 on a range of different non-porous substrates is summarised below, printed using a fusion conveyor system Light Hamer 6 (H bulb) at a speed of 30 m/min. Results are summarised in the table below.

| Substrate | PQ text/10 | PQ blocks/10 | Scratch Resistance |
|---|---|---|---|
| Permasleeve | 8 | 6 | 5 |
| Metalised Polyester | 7 | 8 | 10 |
| Polyester | 8 | 9 | 10 |
| Polyester | 10 | 10 | 10 |
| Vinyl | 10 | 8 | 10 |
| Aluminium | | | 5 |
| Polystyrene | | | |
| Polyimide | 10 | 9 | 7 |
| Polypropylene | 10 | 8 | 7 |
| Heatex | 3 | 2 | 5 |
| PVC | 10 | 10 | 10 |
| ABS | 10 | 10 | 10 |
| PC with PVC centre | 10 | 10 | 9 |
| Oil-based Litho on PVC | 10 | 10 | 9 |
| Solvent-based litho on PVC | 10 | 10 | 10 |

All results are on a scale of 1 to 10, with 10 being the best. PQ indicates print quality assessed as printed text or printed solid blocks.

The invention claimed is:

1. A single phase aqueous curable composition suitable for thermal inkjet printing and having a viscosity of less than about 12 mPa·s at 25° C., comprising
   a mixture of curable materials;
   water in an amount in the range 10 to 30% of the weight of the composition;
   one or more co-solvents for the curable materials;
   a pigment; and
   at least one dispersant,
wherein the curable materials are fully in solution, being dissolved in the water and co-solvent or being fully miscible therewith.

2. A composition according to claim 1, wherein water is present in an amount in the range 10 to 25% by weight.

3. A composition according to claim 1, wherein water is present in an amount in the range 15 to 20% by weight.

4. A composition according to claim 1, wherein the curable materials comprise one or more acrylate monomers.

5. A composition according to claim 1, wherein the curable materials comprise one or more trifunctional acrylate monomers.

6. A composition according to claim 5, comprising one or more alkoxylated trimethylolpropane tri(meth)acrylates.

7. A composition according to claim 6, comprising one or more ethoxylated trimethylolpropane triacrylates.

8. A composition according to claim 7, comprising EO3 trimethylolpropane triacrylate.

9. A composition according to claim 1, wherein the curable materials comprise one or more difunctional acrylate monomers.

10. A composition according to claim 9, comprising one or more glycol di(meth)acrylates.

11. A composition according to claim 10, comprising one or more propylene glycol diacrylates.

12. A composition according to claim 11, comprising dipropylene glycol diacrylate.

13. A composition according to claim 1, comprising one or more monofunctional acrylates.

14. A composition according to claim 13, comprising tetrahydrofurfuryl acrylate.

15. A composition according to claim 1, wherein the curable materials comprise at least one trifunctional acrylate, and at least one difunctional acrylate and/or at least one monofunctional acrylate.

16. A composition according to claim 15, wherein the curable materials comprise at least one trifunctional acrylate, at least one difunctional acrylate and at least one monofunctional acrylate.

17. A composition according to claim 1, comprising at least one curable N-vinyl material.

18. A composition according to claim 17, wherein the N-vinyl material is N-methyl-N-vinyl acetamide and/or N-vinyl acetamide.

19. A composition according to claim 1, wherein the cosolvent comprises one or more from the group consisting of ethers, lactones and imidazolidinones.

20. A composition according to claim 19, wherein the co-solvent comprises one or more from the group consisting of ethylene glycol monobutyl ether, gamma butyrolactone and 1,3-dimethyl-2-imidazolidinone.

21. A composition according to claim 1, wherein the dispersant is selected from Solsperse 20,000 and Tego Dispers 650.

22. A method of printing, comprising thermally inkjet printing a composition in accordance with claim 1 onto a substrate.

23. A method according to claim 22, wherein the substrate is non-porous.

24. A printed substrate produced by the method of claim 22.

* * * * *